June 18, 1957
C. L. GRAYBILL
2,796,161
HYDRAULICALLY ACTUATED ATTACHMENT
FOR POWER-DRIVEN TOOL CHUCKS
Filed July 26, 1955
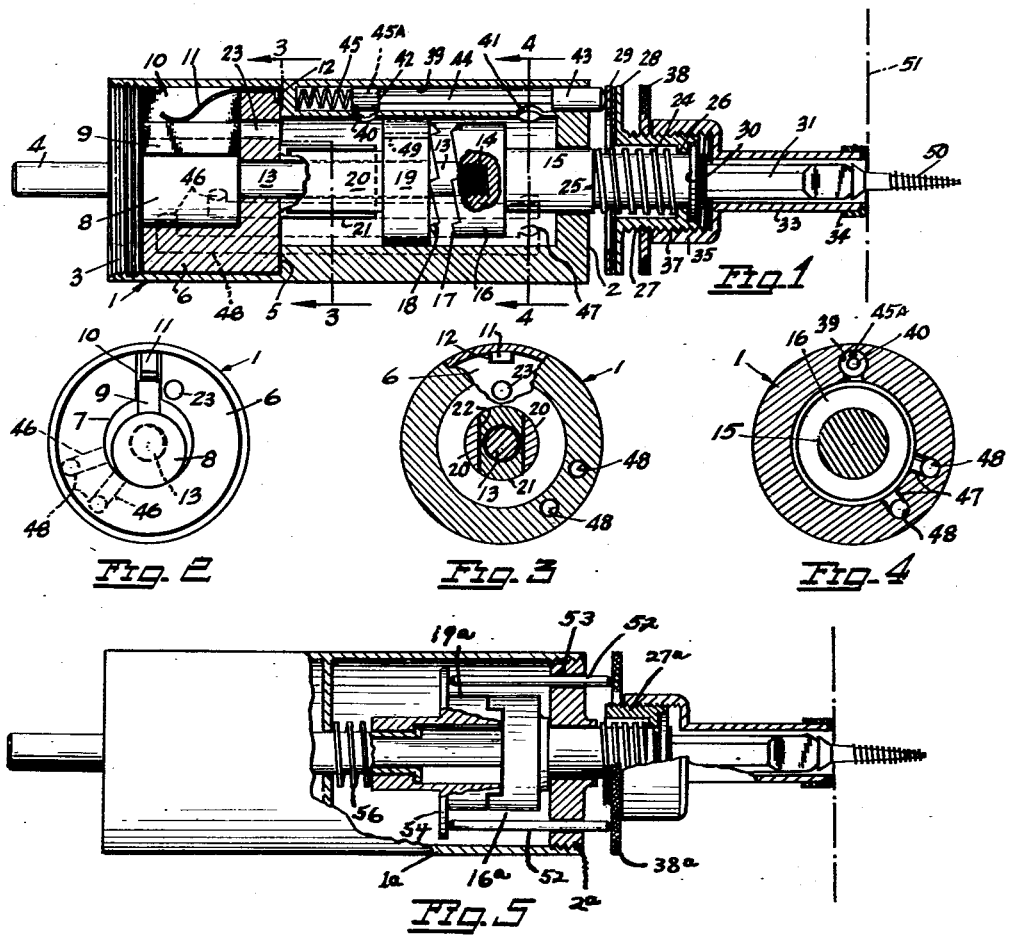
CLINTON L. GRAYBILL
INVENTOR.
BY James L. Girnan
ATTY

United States Patent Office 2,796,161
Patented June 18, 1957

2,796,161

HYDRAULICALLY ACTUATED ATTACHMENT FOR POWER-DRIVEN TOOL CHUCKS

Clinton L. Graybill, Superior, Mont.

Application July 26, 1955, Serial No. 524,372

6 Claims. (Cl. 192—138)

This invention relates to improvements in portable power tools and is particularly directed to an attachment for the chuck of such power driven tools.

A primary object of this invention is to provide a hydraulically actuated clutch means for coupling a screw driver bit or similar tool chuck to the chuck of a power tool and to provide a release means, responsive to the driving of a screw to a predetermined depth in a work piece, for the clutch means.

Another important object of this invention is to provide a cylindrical housing adapted to house a pump, a clutch engaged by the fluid pressure from the pump and a chuck rotated by the clutch, the housing being small and compact and being adapted to be attached to the tool chuck of a portable power tool and having a clutch release means at its outer end, surrounding the chuck, and adapted to automatically disengage the clutch.

A further important object of this invention is to provide a pump adapted to be driven by the chuck of a power tool and to produce fluid pressure which acts on a piston to engage it with a tool chuck, the piston and chuck having interfitting teeth constituting a clutch means and to provide means for bypassing the fluid pressure into a closed circuit from the piston so as to permit the piston and chuck to disengage, such latter means being actuated by a release means engageable at selected predeterminable times with the work piece into which a screw, for example, is being driven by a screw driver bit in the chuck.

A still further object of this invention is to provide an adjustable depth gauge means which operates a valve means to divert the fluid pressure from the piston into a closed circuit.

A still further object of this invention is to provide a compact, inexpensive and sturdy hydraulically actuated and automatically released coupling means between a chuck of a power tool and a tool chuck in which a screw driver bit or the like tool may be inserted, the rotation of the tool chuck being controlled by a fluid pressure pump and system and an automatic release means acting on a valve means in the system so that the power tool may be maintained in constant operation while the screw driver bit is operative under control of the hydraulic system.

In the accompanying drawing:

Figure 1 is a longitudinal sectional view of the attachment with parts thereof shown in elevation and showing the same in use for driving a screw into a work piece.

Figure 2 is an end elevational view thereof with the removable end plug removed.

Figure 3 is a transverse cross-sectional view taken on line 3—3 of Figure 1.

Figure 4 is a transverse cross-sectional view taken on line 4—4 of Figure 1.

Figure 5 is a longitudinal sectional view, partly in elevation, of a modified form of attachment.

In Figure 1 reference numeral 1 indicates a main housing of hollow cylindrical form permanently closed at one of its ends, as at 2, and closed at its opposite end by a removable threaded plug 3 formed with a stem 4 for engagement with the chuck of a power driver (not shown). An internal annular shoulder 5 is formed inwardly from one end of the main housing to form an abutment for the inner end of a pump housing 6 removably secured in place against the shoulder by the plug 3. The pump housing is concentrically bored as at 7. Eccentrically disposed within the bore 7 is a vane pump, generally indicated at 8 and cooperating with a vane 9 radially slidable within a radial slot 10 and backed by a leaf spring 11, which is attached at one of its ends to the pump housing 6, as at 12. The spring maintains the vane in wiping contact with the pump at all times. The pump is formed integral with a shaft 13 extending inwardly from the pump housing and externally threaded at its inner end 14 for attachment to the inner end of a tool chuck 15 which is enlarged as at 16 and formed with ratchet teeth 17 for cooperation with companion teeth 18 formed on adjacent face of a piston 19.

The piston is reduced in diameter and bifurcated as at 20 and slidably embraces an extension 21 of the housing 6 flattened on both of its sides as at 22. The piston rotates at all times with the pump housing 6 and the main housing 1. The interior of the pump housing is in communication through a port 23 with the space between the inner face of the pump housing and the piston 19.

The chuck 15 rotatably extends outwardly through the closed end 2 of the main housing 1 and is surrounded by a compression spring 24 whose inner end bears against an annular shoulder 25 on the shaft and whose opposite end bears against the inner end of an annular shoulder 26 formed on the interior of a cylindrical housing 27 flanged as at 28 and provided with a thrust bearing 29, if desired. The housing 27 is slidably retained on the chuck 15 by a nut 30 on the outer end of the chuck. The chuck is adapted to receive a driver bit 31 in the usual manner. The driver bit is surrounded by a sleeve 33 faced at its outer end with a protective rubber collar 34 or the like. The inner end of the sleeve is enlarged as at 35 and is internally threaded for adjustable mounting on the external threads 37 on the housing 27. A lock nut 38 is provided for locking the sleeve 33 with respect to the housing 27 in any selected adjusted position.

The relatively thick portion of the wall of the main housing 1 is longitudinally bored as at 39. The bore is in communication with the interior of the housing through ports 40 and 41 arranged respectively rearwardly of the piston 19 and forwardly of the enlarged inner end 16 of the chuck 15. The ports are adapted to be opened and closed by piston valves 42 and 43, respectively, interconnected by a rod 44 backed at its inner end by a compression spring 45. The piston 42 has an aperture 45A extending therethrough to allow escapement of fluid or air. The piston 43 at the opposite end of the rod is in the path of longitudinal movement of the flange 28 and bearing 29 of the housing 27.

The bore 7 of the pump housing 6 is in communication with the interior of the main housing in advance of the enlarged inner end 16 of the chuck 15 by means of ports 46 and 47, respectively, and communicating ducts 48.

The piston 19 is formed with an orifice 49 for the passage of fluid therethrough.

As the screw 50 approaches the depth it is to be driven into the work-piece 51 as determined by the setting of the sleeve 33 with respect to the driver bit 31, the flange and bearing 28—29 of the housing 27 will move the pistons 43 and 42 inwardly which will open the port 40. When this occurs the fluid pressure previously acting upon the piston 19 to engage it with the chuck 15 will bypass through the bore 39, the port 41, to the interior of the housing around the enlarged portion 16 of the chuck and against the piston 19 to disengage it from the chuck, then through ports 47, ducts 48 and ports 46 into the bore 7 of the pump housing 6. The disengagement of the chuck will of course stop its operation the instant the screw is driven to the predetermined depth as aforesaid.

In Figure 5, a modified form of clutch release is provided, wherein the lock nut 38a on the housing 27a bears against rods 52 which are axially slidable through openings 53 in the end 2a, the latter end being removably threaded in place in the threaded end of the housing 1a. The rods bear against a radial flange 54 on the piston 19a and serve to move the piston rearwardly away from the enlarged end 16a of the chuck and against the urgement of the spring 56, when the end 34a of the sleeve 33a abuts against the surface of the work piece 51a.

While the best known form of and environment for this invention has been shown and described herein, other forms and environments may be commercially realized as come within the scope of the invention defined by the appended claims.

What is claimed is:

1. For use with a power tool, a power attachment comprising a main housing having opposing closed ends, a stem projecting from one end for attachment in the chuck of a power tool for rotating the main housing, a pump housing in said one end of the main housing and rotatable with the main housing, a pump disposed within the pump housing, a shaft extending longitudinally in the main housing from the pump and disposed through the pump housing, a chuck secured on the end of shaft, said other end of the main housing having an opening through which the chuck rotatably extends, a piston slidably and nonrotatably disposed on the shaft inwardly of the chuck, said piston and chuck having confronting faces provided with interengaging means, said pump housing having a port for the delivery of fluid pressure from the pump to the piston to move the piston axially so that the interengaging means are in contact, a fluid circuit in the main housing, a valve controling said circuit and means on said chuck and engageable with a work piece for operating said valve to divert the fluid pressure of the pump into the fluid circuit and in front of the piston so that the piston can move away from the chuck.

2. A power attachment as claimed in claim 1, wherein said last means is adjustable.

3. A power attachment as claimed in claim 1, wherein said pump housing is eccentrically bored and said pump includes a rotor disposed within the bore, said pump housing having a radial slot communicating with the bore, a vane radially slidable in the slot and spring means backing the vane and maintaining it in wiping contact at all times with the rotor from which the shaft eccentrically extends.

4. A power attachment as claimed in claim 1, wherein said fluid circuit includes a longitudinal bore in the wall of the main housing having lateral ports communicating with the interior of the housing behind the piston and in front of the piston, said valve controlling one of said ports, spring means normally retaining said valve closed so that the fluid pressure acts on the piston and a second longitudinal bore in the wall of the main housing having lateral ports communicating with the interior of the main housing in front of the piston and with the pump so that when said valve is opened the fluid pressure will by-pass the piston and flow from the pump through the first longitudinal bore to the main housing in front of the piston and return to the pump through the second longitudinal bore.

5. A power attachment as claimed in claim 4, wherein said valve is slidable in the bore, a rod extending from the valve and a piston on the rod engaged by the means on the chuck to slide the valve to an open position.

6. A power attachment as claimed in claim 1, wherein said last means includes an axially adjustable sleeve circumposed on the chuck and slidable axially relative thereto, means limiting the axial movement of the sleeve which is adapted to abut a work piece and be moved rearwardly thereby to actuate the valve.

References Cited in the file of this patent
UNITED STATES PATENTS 2,235,374   Kellog _____ Mar. 18, 1941

FOREIGN PATENTS 722,676   Germany _____ July 16, 1942